United States Patent [19]

Dousset

[11] 4,121,812
[45] Oct. 24, 1978

[54] ELASTOMER STRESS DAMPER WITH CONSTRUCTABLE ORIFICE

[76] Inventor: Rémy Dousset, 100B Cours Lafayette, 69003 Lyons, France

[21] Appl. No.: 788,646

[22] Filed: Apr. 18, 1977

[30] Foreign Application Priority Data

Apr. 20, 1976 [FR] France .................................. 76 11539

[51] Int. Cl.² ............................................ B60G 11/62
[52] U.S. Cl. ..................................... 267/35; 138/45; 188/298; 188/314; 267/121; 267/152
[58] Field of Search ............... 267/35, 152, 65 R, 151, 267/121, 137, 138, 139, 140; 188/314, 298, 284; 138/45, 46; 251/4, 7

[56] References Cited

U.S. PATENT DOCUMENTS

| 1,915,303 | 6/1933 | Forsyth | 267/35 |
| 2,760,604 | 8/1956 | Wyeth | 188/284 |
| 2,991,992 | 7/1961 | Elsner | 188/298 X |
| 3,342,215 | 9/1967 | Griffin | 138/45 |
| 3,970,105 | 7/1976 | Pelton et al. | 138/45 X |

FOREIGN PATENT DOCUMENTS

| 273,963 | 1/1962 | Netherlands | 267/65 R |
| 811,748 | 4/1959 | United Kingdom | 267/35 |

*Primary Examiner*—George E. A. Halvosa
*Attorney, Agent, or Firm*—Haseltine, Lake, & Waters

[57] ABSTRACT

A stress damper comprising a hydraulic accumulator having an expansible cavity filled with hydraulic fluid, a body of elastomer provided with at least one internal cavity filled with hydraulic fluid, and an intermediate element of elastomer provided between the accumulator and the elastomer body, having at least one duct providing communication between the cavities in the accumulator and the elastomer body and arranged so that a compressive stress applied to the accumulator will cause a reduction in the cross-section of the duct.

11 Claims, 4 Drawing Figures

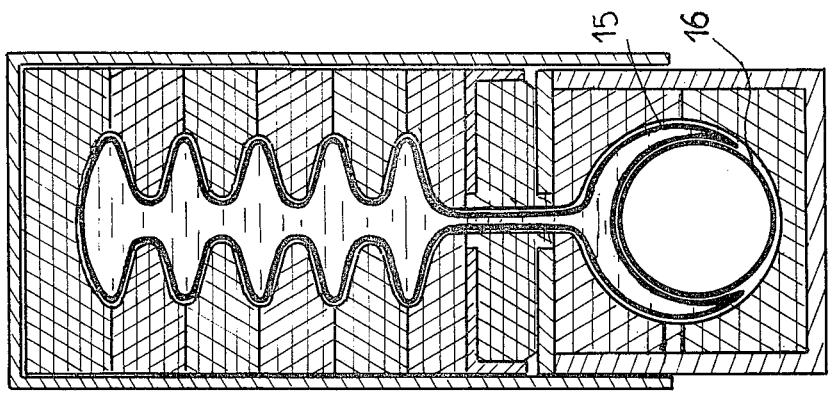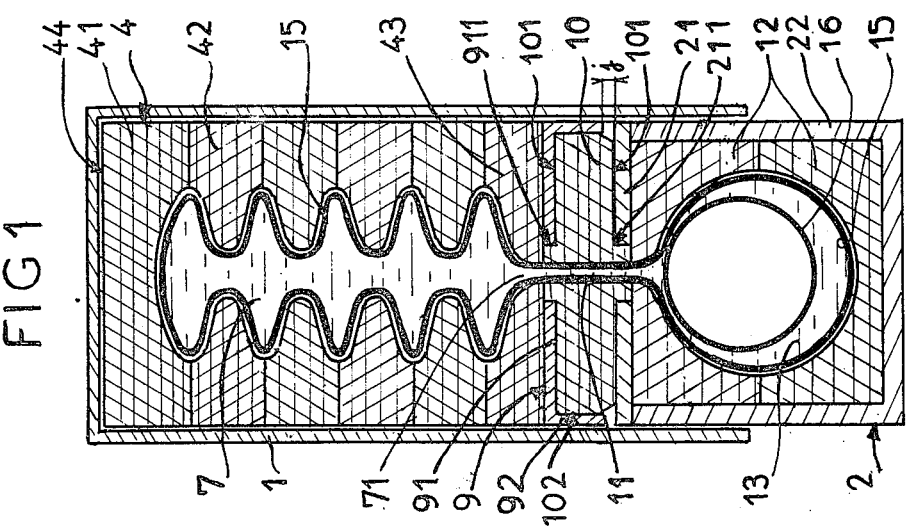

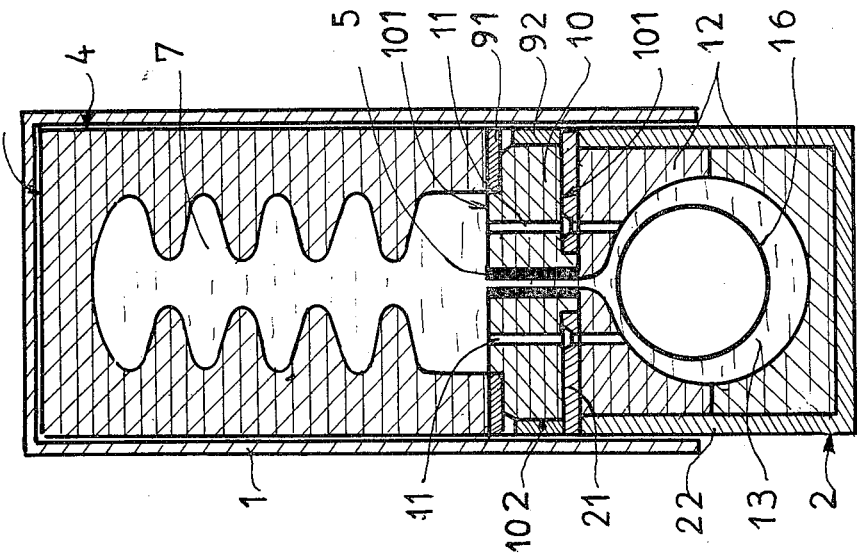
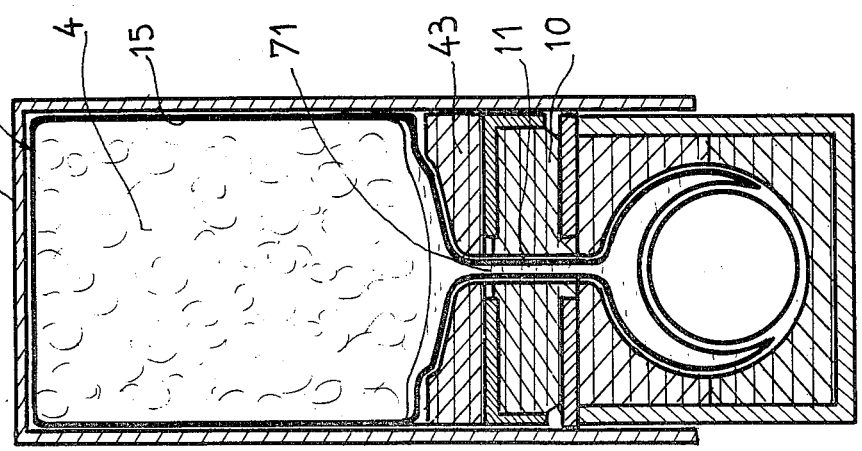

ELASTOMER STRESS DAMPER WITH CONSTRUCTABLE ORIFICE

FIELD OF THE INVENTION

The present invention relates to improvements in dampers for damping energy produced by the impact of two bodies in relative motion, for example, for absorbing impacts which are produced at the end of travel of a gantry crane or upon coupling of two railway carriages.

PRIOR ART

Dampers for absorbing impact energy are known, such as hydraulic dampers acting by throttling of an imcompressible fluid in a nozzle of suitable cross-section. This type of damper has the disadvantage of demanding accurate machining and well-finished sealing devices.

Dampers are also known of elastomer, which absorb the energy by deformation. Dampers have been developed of elastomer, such that the elastomer material employed is both compressible and endowed with a viscosity which is variable as a function of the stress applied.

A damper is known which associates damping by elastomer with damping by throttling a hydraulic liquid. The body of elastomer includes an internal cavity which is filled with an incompressible fluid and which communicates by an orifice of small cross-section with a hydraulic accumulator. The cross-section of the orifice does not vary.

SUMMARY OF THE INVENTION

It is an object of the invention to provide a stress damper comprising a hydraulic accumulator defining an expansible cavity which is filled with hydraulic fluid; a body of elastomer provided with at least one internal cavity which is filled with hydraulic liquid; an intermediate element of elastomer which is arranged between said accumulator and said body of elastomer and defines at least one duct through which said cavity in said body and said cavity in said accumulator communicate; and means substantially enclosing said intermediate element such that a compressive stress applied to said damper will cause a constriction in the cross-section of said duct by deformation of said intermediate element.

BRIEF DESCRIPTION OF THE DRAWINGS

The invention will be more fully understood from the following description of embodiments thereof, given by way of example only, with reference to the accompanying drawings.

In the drawings:

FIG. 1 is a longitudinal section through one embodiment of a damper in accordance with the invention;

FIG. 2 is a longitudinal section through another embodiment of a damper similar to that of FIG. 1 but with a slightly different pressure accumulator;

FIG. 3 is a longitudinal section through a further embodiment of a damper similar to that of FIG. 2 but in which the body of elastomer consists of a mass of spongy elastomer, and FIG. 4 is a longitudinal section through a further embodiment of a damper in accordance with the invention.

DETAILED DESCRIPTION

Referring to FIGS. 1 to 4, the damper includes a body 4 formed of a moulded elastomer which provides damping of impacts.

The body 4 defines at least one internal cavity 7 with an orifice 71. The cavity or cavities internal to the body 4 are filled with an hydraulic liquid, such as oil.

The damper includes an hydraulic accumulator 2 which communicates in an oiltight manner with the cavity 7 in the body 4 so as to receive a variable quantity of hydraulic liquid under pressure.

The accumulator 2 comprises a reservoir formed in an internal cavity 13 capable of withstanding the pressure of the hydraulic liquid. An elastic bag 16 inflated with a gas, such as nitrogen, is arranged in the internal cavity 13 to provide an internal cavity, which is expansible and is filled with hydraulic liquid, within the internal cavity 13 and outside the elastic bag 16. One or more orifices 11 are provided for communication with the cavity 7 in the body 4 of elastomer.

Between the accumulator 2 and the body 4 is arranged an intermediate element 10 in the form of a disc and which is produced from elastomer. This disc 10 has two plane faces 101 which are parallel and perpendicular to the direction in which a compressive stress will be applied to the damper. A compressive stress acting on the accumulator tends to bring the face 44 of the body 4 of elastomer, which is opposite the orifice 71 and the accumulator 2, nearer the accumulator.

The disc 10 is provided with at least one duct 11 parallel to the direction of application of a compressive force to be applied to the damper. This duct places the orifice 71 in the elastomer body 4 and the cavity 13 in the accumulator in communication.

One face 101 of the disc is arranged against a rigid disc 21 on the pressure accumulator. Mechanical means enclose the disc 10 so that when a compressive stress is applied to the damper the duct 11 is reduced in cross-section. In this regard, the outer annular surface 102 of the disc is enclosed in a sheath 92 so that when the two faces 101 are brought nearer together, the disc cannot deform radially outwardly but tends to deform to reduce the cross-section of the duct 11.

Preferably the disc 10 is arranged between two rigid discs 91 and 21 applied to the faces 101 and pierced respectively with bores 911 and 211. In FIGS. 1 to 3 the sheath 92 and the disc 91 enclosing the disc 10 are integral so as to form a bell 9. The ring 92 may alternatively be integral with the rigid disc 21. A clearance $j$ is provided between the edge of the bell and the disc 21 so as to enable compression of the disc 10. The faces of the disc 10 are preferably not made to adhere to the metal sheath.

In the embodiments of FIGS. 1 to 3 the disc 10 has only one duct 11. The hydraulic tightness between the block of elastomer 4, the disc 10 and the accumulator must be perfect. This oiltightness is obtained by a bladder 15 containing the hydraulic fluid which lines the duct 11 and the accumulator.

In the embodiments of FIGS. 1 and 2 the bladder 15 also lines the internal cavity 7 formed in the body 4 of elastomer. The single volume 7 may be replaced by a number of cavities distributed through the body 4, provided that they are connected by one or more ducts communicating with the orifice 71.

In the embodiment of FIG. 3 the body 4 is formed by a spongy mass of elastomer of open porosity, the pores being filled with oil. The bladder 15 envelops the whole spongy mass. At the time of application of stress the deformation of the spongy mass 4 participates in the absorption of part of the energy and the oil contained in the porosities is partially driven out of the mass and forced through the duct 11 under the same conditions as in the embodiments of FIGS. 1 and 2.

In the embodiments of FIGS. 1 and 4 the bladder 15 which is filled with hydraulic fluid also contains the elastic bag 16 filled with gas.

In the embodiments of FIGS. 2 and 3 the elastic bag 16 filled with gas is outside the bladder 15 filled with hydraulic fluid.

In the embodiments of FIGS. 1 and 2 the body 4 is formed by a stack of discs 41, 42, 43 of moulded elastomer. The end disc 41 is whole. The intermediate discs 42 have central apertures of large cross-section. The disc 43, with which the embodiment of FIG. 3 is also provided, adjacent to the disc 10 has a central aperture which has a cross-section which reduces to provide the orifice 71 towards its end portion. The whole of the stack of these discs of elastomer thus forms the internal cavity 7 closed at one end and open at the other through the orifice 71 of small cross-section.

The damper includes two cases 1 and 22 fitted one into the other and able to telescope longitudinally with respect to one another. The stress to be damped may equally well be applied to one or other of the cases, the other then bearing for reaction against a fixed abutment. The case 1 envelops the body 4 of elastomer whilst the case 22 envelops the hydraulic accumulator. The case 22 is partially filled by two blocks of elastomer 12 which form the internal cavity 13 of the accumulator.

In the embodiments of FIGS. 1 and 3, compression of the disc 10 is limited when the edge of the bell 9 comes to be applied against the accumulator.

In the embodiment of FIG. 4 the disc 10 has a metal insert 5 which forms a duct which places the cavity 7 in the body of elastomer in communication with the accumulator. Furthermore, the disc 10 is pierced with a number of ducts 11 which also place the cavity 7 in communication with the accumulator.

It may be seen that if a stress is applied to the body 4, the accumulator 2 then forming an abutment, the body 4 of elastomer transmits the stress to the disc 10 which takes up a reaction directly against the case of the accumulator 2. The stress transmitted to the disc 10 which tends to compress it leads to deformation of the elastomer of the disc. This deformation cannot occur radially outwardly because of the ring 92. The bores 911 and 211 have a diameter slightly greater than the diameter of the duct 11 in order to enclose the disc 10 to the maximum. Deformation of the constant-volume elastomer can then only occur by constriction of the cross-section of the duct or ducts 11. Furthermore, deformation of the body 4 tends to reduce the volume of the cavity 7, which causes oil to be driven from the cavity 7 towards the duct 11 of reducing cross-section.

It may be seen that damping is provided both by the energy of deformation of the body 4 of elastomer and by the throttling of the fluid through the duct 11. It will be observed in addition that the greater the stress that is applied and consequently the greater the deformation of the disc 10, the more the cross-section of the duct 11 is reduced and the greater the throttling effect in this duct. The minimum cross-section of the duct or ducts which place the cavity in the body of elastomer and the accumulator in communication is limited so that shutting off is not completed. For this purpose the axial compression of the disc 10 is limited in the embodiments of FIGS. 1 to 3 by the edge of the bell 9 which comes into abutment against the top portion 21 of the accumulator casing before the duct 11 is entirely shut off by the action of deformation. In the embodiment of FIG. 4 it is the duct formed in the metal insert 5 which prevents shutting off of the communication.

Oil driven out of the cavity 7 through the duct 11 towards the cavity 13 compresses the bag 16, thus increasing the pressure in the cavity 13. When the stress applied starts to decrease the body of elastomer 4 is decompressed, progressively bringing the volume of the cavity 13 back to its original volume, and the counterpressure of the gas in the bag 16 makes the oil return from the cavity 13 to the cavity 7 for a return to the rest position.

Of course the invention is not intended to be strictly limited to the embodiments which have just been described by way of example but it likewise covers embodiments which might differ from them only in detail, in variants upon the execution, or in the employment of equivalent means.

Thus the hydraulic accumulator might be produced in any other known way. Finally, the oiltightness achieved in the embodiments described by means of a continuous bladder might equally well be achieved by any other known forms of seals.

There is thus provided a damper which associates damping by elastomer with hydraulic damping and which is such that the hydraulic damping increases as a function of the intensity of the stress applied. This increase in the damping is obtained by progressive reduction in the flow of the hydraulic liquid through an element of elastomer. This progressive reduction does not, however, reach complete shut-off.

What is claimed is:

1. A stress damper comprising a hydraulic accumulator including a case defining an expansible cavity which is filled with hydraulic fluid; a body of elastomer provided with at least one internal cavity which is filled with hydraulic liquid; an intermediate element of elastomer which is arranged between said accumulator and said body of elastomer and defines at least one duct through which said cavity in said body and said cavity in said accumulator communicate; and means substantially enclosing said intermediate element all around the outside surface thereof such that a compressive stress applied to said damper will cause a constriction in the cross-section of said duct by inward deformation of said intermediate element said means enclosing said intermediate element including a bell-shaped portion, said intermediate element having the form of a disc with parallel opposite surfaces, and a cylindrical peripheral surface and a rigid, second disc on said case, said intermediate element being interposed between said bell-shaped portion and said second disc with said opposite surfaces in respective contact therewith, said bell-shaped portion having one face resting on one surface of said intermediate element and including a cylindrical sheath having an internal surface in contact with the cylindrical peripheral surface of said intermediate element, said sheath having a lower edge spaced from said second disc to define a gap therewith, said intermediate element being confined by said bell-shaped portion and second disc to undergo deformation until said gap is taken-up.

2. A stress damper as claimed in claim 1, wherein said body of elastomer is formed by a stack of discs of elastomer, an end one of said discs adjacent said intermediate element being provided with an aperture of small cross-section, the other end one of said discs being non-apertured, the other discs being provided with a central aperture of large cross-section.

3. A stress damper as claimed in claim 1, including a bladder which internally lines said cavity in said body of elastomer, said duct and said cavity in said accumulator.

4. A stress damper as claimed in claim 3, wherein said hydraulic accumulator includes an elastic bag which is filled with a gas and which is arranged within said bladder.

5. A stress damper as claimed in claim 3, wherein said hydraulic accumulator includes an elastic bag which is filled with a gas and which is arranged externally of said bladder.

6. A stress damper as claimed in claim 1, wherein said body of elastomer is formed by a spongy mass of open porosity contained in a flexible bladder which lines said duct and said cavity in said accumulator.

7. A stress damper as claimed in claim 6, wherein said hydraulic accumulator includes an elastic bag which is filled with a gas and which is arranged within said bladder.

8. A stress damper as claimed in claim 6, wherein said hydraulic accumulator includes an elastic bag which is filled with a gas and which is arranged externally of said bladder.

9. A stress damper as claimed in claim 1, wherein said intermediate element includes a metal insert forming a duct connecting said cavity in said body of elastomer to said cavity in said accumulator.

10. A stress damper as claimed in claim 1 wherein said gap is sized in relation to said duct so that said lower edge of the bell-shaped portion contacts said second disc before said duct is entirely shut-off.

11. A stress damper as claimed in claim 1 wherein said duct is rectilinear and of substantially uniform cross-section extending from one surface to the other of said intermediate element perpendicular to said surfaces, said bell mouthed portion and second disc having apertures aligned with said duct, said apertures being substantially greater in diameter than said duct.

* * * * *